United States Patent [19]

Ohta et al.

[11] Patent Number: 4,974,251
[45] Date of Patent: Nov. 27, 1990

[54] CORDLESS TELEPHONE SYSTEM

[75] Inventors: Yuji Ohta, Suita; Michimasa Shirakata, Yokosuka; Akio Yotsutani, Tokyo; Toshihiro Hara, Tokyo; Shoji Fuse; Koji Ono, both of Hachioji, all of Japan

[73] Assignees: Nippon Telegraph and Telephone Corporation; NEC Corporation, both of Tokyo; Kabushiki Kaisha Toshiba, Kawasaki, all of Japan

[21] Appl. No.: 230,550

[22] Filed: Aug. 10, 1988

[30] Foreign Application Priority Data

Aug. 24, 1987 [JP] Japan .................. 62-209965

[51] Int. Cl.[5] .......................................... H04M 11/00
[52] U.S. Cl. .......................................... 379/61; 379/63
[58] Field of Search .................. 379/58–63; 455/33

[56] References Cited

U.S. PATENT DOCUMENTS

| | | |
|---|---|---|
| 4,180,708 | 12/1979 | Yamaguchi et al. ............... 379/60 |
| 4,415,770 | 11/1983 | Kai et al. ............................ 379/59 |
| 4,575,582 | 3/1986 | Makino .............................. 379/63 |
| 4,640,987 | 2/1987 | Tsukada et al. .................... 379/61 |
| 4,726,052 | 2/1988 | Kato et al. ......................... 379/61 |

FOREIGN PATENT DOCUMENTS

| | | | |
|---|---|---|---|
| 0182228 | 9/1985 | Japan .................................. 379/58 |
| 0128635 | 6/1986 | Japan .................................. 379/58 |

Primary Examiner—Jin F. Ng
Assistant Examiner—Magdy Shehata
Attorney, Agent, or Firm—Finnegan, Henderson, Farabow, Garrett and Dunner

[57] ABSTRACT

A cordless telephone system comprises a radio telephone set and a connection unit connected to a wire telephone circuit and also connected to the radio telephone set through a radio communication circuit, for interconnection control between the wire telephone circuit and the radio telephone set. When the wire telephone circuit is put in an unusable state or a signal on the radio communication circuit is put in an unreceivable state, the connection unit transmits a disconnecting signal to the wireless telephone set to forcibly cut off the radio communication circuit.

14 Claims, 12 Drawing Sheets

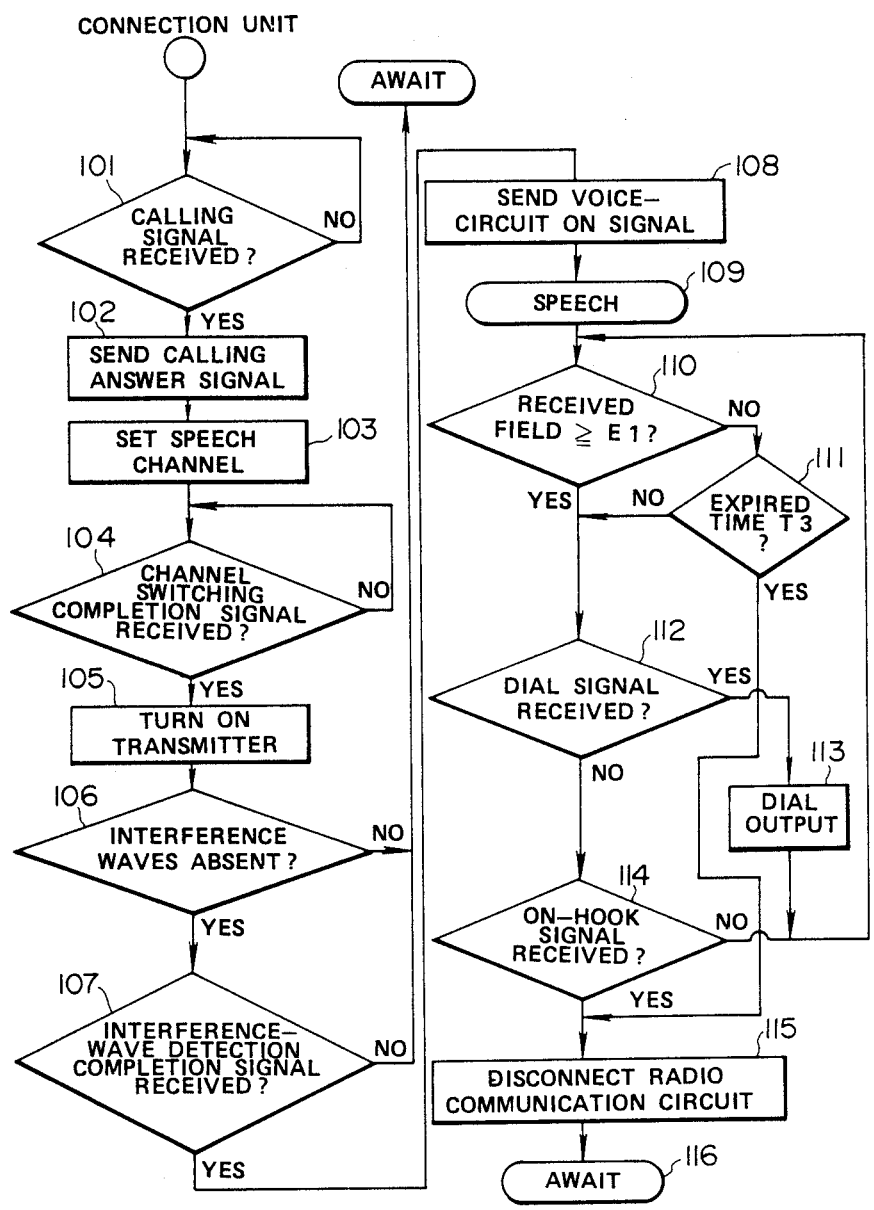
FIG.6(a) *(PRIOR ART)*

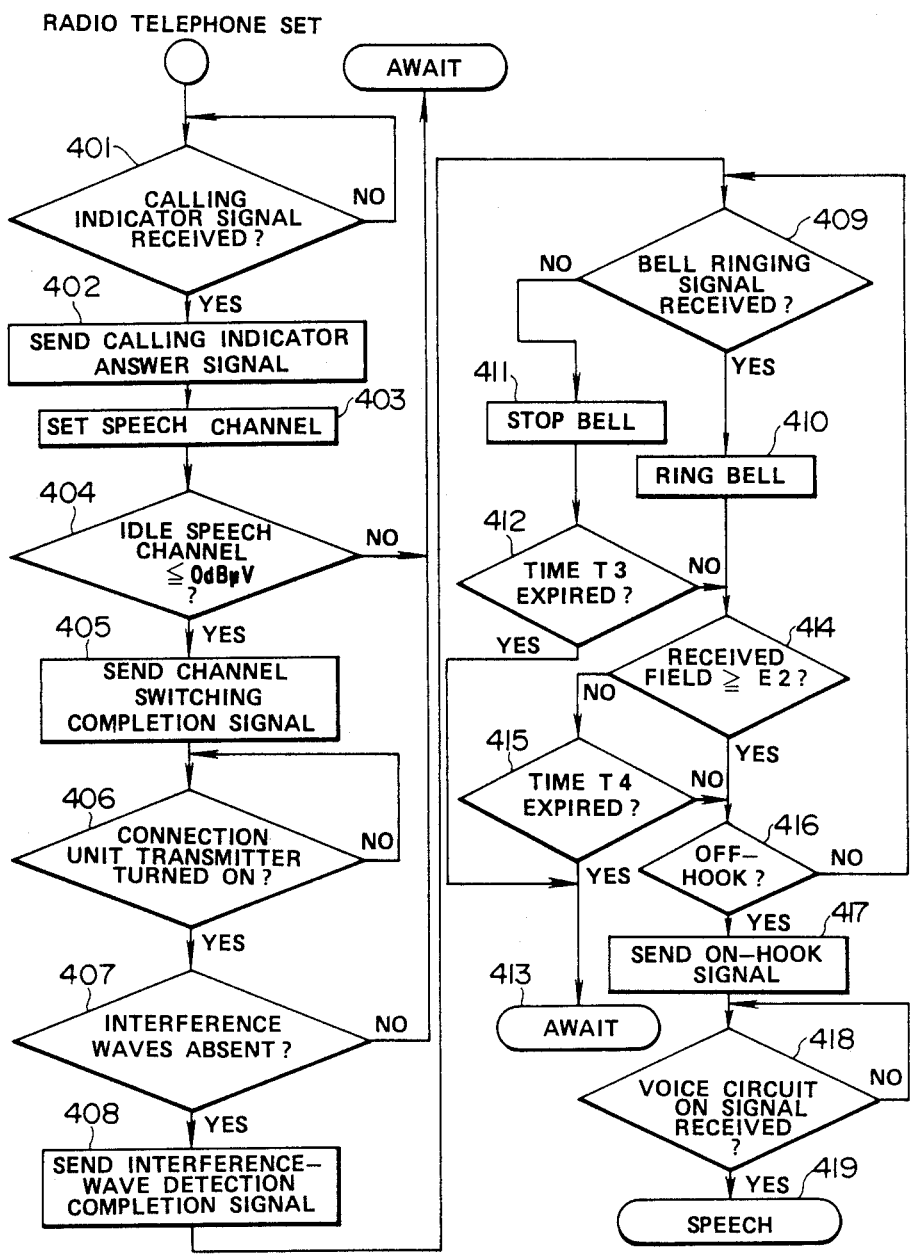
FIG.7(b) *(PRIOR ART)*

CORDLESS TELEPHONE SYSTEM

BACKGROUND OF THE INVENTION

1. Field of the Invention

The present invention relates to a cordless telephone system which comprises a connection unit connected to a wire telephone circuit and a radio telephone set connected through a radio communication circuit to the connection unit and, more particularly, to a cordless telephone system which effectively utilizes a radio comunication circuit between a connection unit and a radio telephone set.

2. Description of the Related Art

A cordless telephone system comprises a connection unit connected to a wire telephone circuit and a radio telephone set connected through a radio communication circuit to the connection unit. Such a cordless telephone system, when it is desired to make a call from the radio telephone set, is operated according to a flowchart as shown in FIG. 6(a) and (b). More specifically, when the radio telephone handset is first picked up, i.e., put in its off-hook state, the radio telephone set sets the radio communication circuit at a control channel (step 201) and subsequently determines whether or not the control channel is idle (step 202). If the control channel is not idle, then the telephone set waits for a predetermined constant time (step 203) and then generates a busy tone (step 204) to return to its await mode. If the control channel is idle, then the radio telephone set turns on its transmitter (step 206) and transmits a calling signal to the connection unit (step 207).

The connection unit, when receiving the calling signal (step 101), transmits an answer signal containing information indicative of an idle communication or speech channel in response to the calling signal (step 102) and then sets the radio communication circuit at the aforementioned idle communication channel (step 103).

The radio telephone set, when receiving the aforementioned answer signal (step 208), sets the radio communication circuit at the idle speech channel specified by the answer signal (step 209). And the radio telephone set determines whether or not the speech channel is idle (step 210). If the speech channel is idle, then the telephone set turns on its transmitter to transmit a channel switching completion signal to the connection unit (step 211).

The connection unit, when receiving the channel switching completion signal (step 104), turns on a transmitter of the unit (step 105) and determines whether or not interference waves are present in the received electric field (step 106).

The radio telephone set, on the other hand, determines whether or not the transmitter of the connection unit has been turned on (step 212) and further determines the presence or absence of any interference waves in the received electric field (step 213). The absence of the interference waves causes the radio telephone set to transmit an interference-wave detection completion signal to the radio telephone set (214).

The connection unit, when receiving the interference-wave detection completion signal (step 107), transmits a voice-circuit ON signal to the radio telephone set (step 108) and thereafter enters into its communication mode (step 109).

The radio telephone set, when receiving the voice-circuit ON signal (step 215), enters into its communication mode (step 216).

In the communication mode of the radio telephone set, the telephone set detects whether or not the received electric field of the speech channel is not smaller than E2 dB$\mu$V (for example, 20 dB$\mu$V) (step 217) and starts measuring an elapsed time after the moment the received electric field has reached less than E2 dB$\mu$V. When the measured time reaches a predetermined time T1, the telephone set generates an alarm sound (step 219). When a time (T1 + T2) further elapses (step 230), the telephone set transmits a speech end signal to the connection unit through the speech channel (step 234) and cuts off the radio communication circuit of the speech channel (step 235). When the received electric field is at a level of E2 dB$\mu$V or higher or when the electric field is lower than E2 dB$\mu$V and the time T1 does not expire yet, the telephone set turns off the alarm sound (step 220). Under such conditions, a dialing operation (step 231) causes the telephone set to send a dial signal to the connection unit (step 232), and an on-hook operation (step 233) causes the telephone set to send a speech end signal thereto (step 234).

On the other hand, the connection unit detects whether or not the received electric field of the speech channel is smaller than E1 dB$\mu$V (for example, 0 dV$\mu$V) (step 110) and starts measuring an elapsed time after the moment the electric field becomes smaller than E1 dB$\mu$V. When the measured elapsed time reaches a predetermined time T3 (step 111), the connection unit disconnects the radio communication circuit of the speech channel (step 115). The connection unti with the received electric field at a level of E1 dB$\mu$V or higher, when receiving the dial signal (step 112), outputs the dial tone onto the wire telephone circuit (step 113).

In this manner, the radio telephone set disconnects the radio communication circuit of the speech channel when the received electric field is at a level of less than E2 dB$\mu$V, while the connection unit disconnects the radio communication circuit of the speech channel when the electric field is at a level of less than E1 dB$\mu$V. For this reason, the radio telephone set is normally disconnected faster than the connection unit. However, in the case where a difference between the transmit and receive frequencies of the speech channel is 100 MHz or more, when an antenna is incorporated in the radio telephone set, the received electric field of the connection unit sometimes reaches a level smaller than E2 dB$\mu$V faster than the received electric field of the radio telephone set reaches a level smaller than E1 dB$\mu$V, because the orientation or direction of such incorporated antenna causes variations of the propagation condition of the received/transmitted radio waves and of the antenna gain, and so on. If such a phenomenon takes place, then the connection unit first disconnects the radio communication circuit and then after the radio telephone set has measured the lapse time (T1 + T2), the telephone set disconnects the radio communication circuit. This causes the radio telephone set to transmit unnecessary waves for the time (T1 + T2).

Explanation will next be made as to the case where an application of a ringing tone from the wire telephone circuit to the connection unit causes the radio telephone set to receive a call. In this case, the connection unit and radio telephone set are operated based on a flowchart as shown in FIG. 7(a) and (b). More in detail, the connection unit, when receiving a ringing tone from the wire telephone circuit (step 301), first sets the radio communication circuit at the control channel (step 302). If the connection unit determines the control channel is idle (step 303), then it transmits to the radio telephone set a call indicator signal containing information indicative of an idle speech channel (step 304).

The radio telephone set, when receiving the call indicator signal (step 401), transmits an answer signal in response to the call indicator signal to the connection unit (step 402) and thereafter sets the radio communication circuit at the speech channel specified by the call indicator signal (step 403). The telephone set then determines whether or not the speech channel is idle (step 404). If idle, then the telephone set transmits a channel switching completion signal to the connection unit (step 405).

On the other hand, the connection unit, when receiving the call-indicator answer signal from the radio telephone set (step 305), sets the radio telephone circuit at this speech channel (step 306). Thereafter, the reception of the channel switching completion signal from the radio telephone set (step 307) causes the telephone to turn on the transmitter (step 308) and to determine the presence or absence of any interference waves in the received electric field (step 309).

The radio telephone set determines whether or not the transmitter of the connection unit is turned on on the basis of the received electric field (step 406) and when determining the absence of any interference waves in the received field (step 407), transmits an interference-wave detection completion signal to the connection unit (step 408).

The reception of the interference-wave detection completion signal (step 310) causes the connection unit to judge whether or not the ringing tone is still being sent from the wire telephone circuit (step 311). If it is still being sent, then the connection unit transmits a bell ringing signal to the radio telephone set (step 312).

The reception of the bell ringing signal (step 409) causes the radio telephone set to ring the bell to inform the operator of the receiving call (step 410), whereas no reception of the bell ringing signal causes the telephone not to ring the bell (step 411). When not ringing the bell, the telephone measures a predetermined time T3 and after passage of the time T3 (step 412), the telphone enters into the await mode (step 413). When the telephone rings the bell or when the time T3 does not elapse, it is determined whether or not the received electric field is not smaller than E2 dBμV (step 414). If the electric field is smaller than E2 dBμV, then the controller measures a predetermined time T4. The passage of the time T4 (step 415) causes the telephone to enter into the await mode (step 413). When the time T4 does not expire or when the received field is equal to or larger than E2 dBμV, the controller judges whether or not the handset of the telephone has been picked up, i.e., the telephone is in an off-hook state (step 416). If it is in the off-hook state then the telephone transmits an off-hook signal (step 417). Thereafter, the reception of a voice-circuit ON signal (which will be explained later) from the connection unit (step 418) causes the telephone to be put in the communication mode (step 419).

The connection unit, when determining the absence of the ringing tone at the step 311, judges at a step 313 whether or not the received electric field is not smaller than E1 dBμV. When the received field is smaller than E1 dBμV, the connection unit measures a time T5 to judge if the time T5 has expired (step 314). At this point, if the time T5 does not expire or if the connection unit judges the received field is not smaller than E1 dBμV at the step 313, then the connection unit judges whether or not it has received the off-hook signal (step 316). The reception of the off-hook signal causes the connection unit to transmit the voice-circuit ON signal (step 317) and to enter into the communication mode (step 318). The expiration of the time T5 at the step 314 causes the connection unit to enter into the await mode (step 315).

In this way, the radio telephone set detects whether or not the received electric field of the speech channel is not smaller than, for example, E2 dBμV (step 414) and starts measuring a lapse time after the moment the field has reached a level smaller than E2 dBμV. When the measured time reaches the predetermined time T4 (step 415), the telephone is put in the await mode (step 413).

On the other hand, the connection unit detects whether or not the received electric field is not smaller than, for example, E1 dBμV (step 313) and starts measuring a lapse time after the moment the field has reached a level smaller than E1 dBμV. When the measured laspe time reaches the predetermined time T5 (step 314), the connection unit is put in the await mode (step 315).

However, even in the case of the presence of a received call, if the received electric field becomes smaller than E1 dBμV faster than the received electric field of the radio telephone set becomes smaller than E2 dBμV, then the connection unit first disconnects the radio communication circuit and then, after having measured the time T4, the radio telephone set disconnects the radio communication circuit. This results, as in the calling mode, in that the radio telephone transmits unnecessary waves for the time T4.

Explanation will next be made as to how a cordless telephone system comprising a connection unit attached with a wire telephone set gives a call and receives a call. In the case where the system is to be put in the calling mode, the connection unit and radio telephone set are operated according to the calling operation of such a flowchart as shown in FIG. 6(a) and (b) to establish a radio communication circuit for a speech channel. In this case, if the wire telephone set of the connection unit occupies a wire telephone circuit, then the system must inform a user of the radio telephone set that the wire telephone circuit is already occupied. To this end, it is considered that the connection unit transmits a busy tone to the radio telephone set. However, this method is not efficient from the viewpoint of the effective utilization of radio waves, since the radio communication circuit of the speech channel is used during the transmission of the busy tone.

In the case where the system is to receive a call, if the wire telephone set answers the call during ringing of the radio telephone set, then the radio telephone cannot receive the bell ringing signal after passage of the time T3 as shown by the flowchart in FIG. 7(b) (step 412) or the radio telephone must disconnect the radio communiction circuit in response to the reduction of the received electric field (step 414) to return to the await mode, in which case the radio telephone set transmits unnecessary radio waves as in the above case, though, for a short time.

As has been explained in the foregoing, the prior art cordless telephone systems are disadvantageous in this, even when the radio communication circuit between the connection unit and radio telephone set is not used for communication, the radio communiation circuit is not disconnected and unnecessarily used.

It is a primary object of the present invention, therefore, to provide a cordless telephone system which prevents the unnecessary use of a radio communication circuit when not being utilized for communication.

SUMMARY OF THE INVENTION

The present invention comprises a radio telephone set, a connection unit connected to a wire telephone circuit and also connected through a radio communication circuit to the radio telephone set for performing interconnection control between the wire telephone circuit and the radio telephone set. A transmitting device is provided in the connection unit for sending a disconnect signal from the connection unit to the radio telephone set to cut off the radio communication circuit when the wire telephone circuit is put in an unusable state or when a signal on the radio communication circuit is put in an unreceivable state. A disconnection circuit is provided in the radio telephone set for forcibly cutting off the radio communication circuit upon receipt of a disconnect signal.

In accordance with the present invention, there can be provided a cordless telephone system which forcibly disconnects the radio communication circuit between the connection unit and radio telephone set to avoid the unnecessary use of the radio communication circuit, the use of the radio circuit for the purpose of nonwhen the wire telephone circuit or the radio communication circuit is in a non-communication state.

DESCRIPTION OF THE PREFERRED EMBODIMENTS

Embodiments of the present invention will be detailed by referring to attached drawings.

Figure 1:
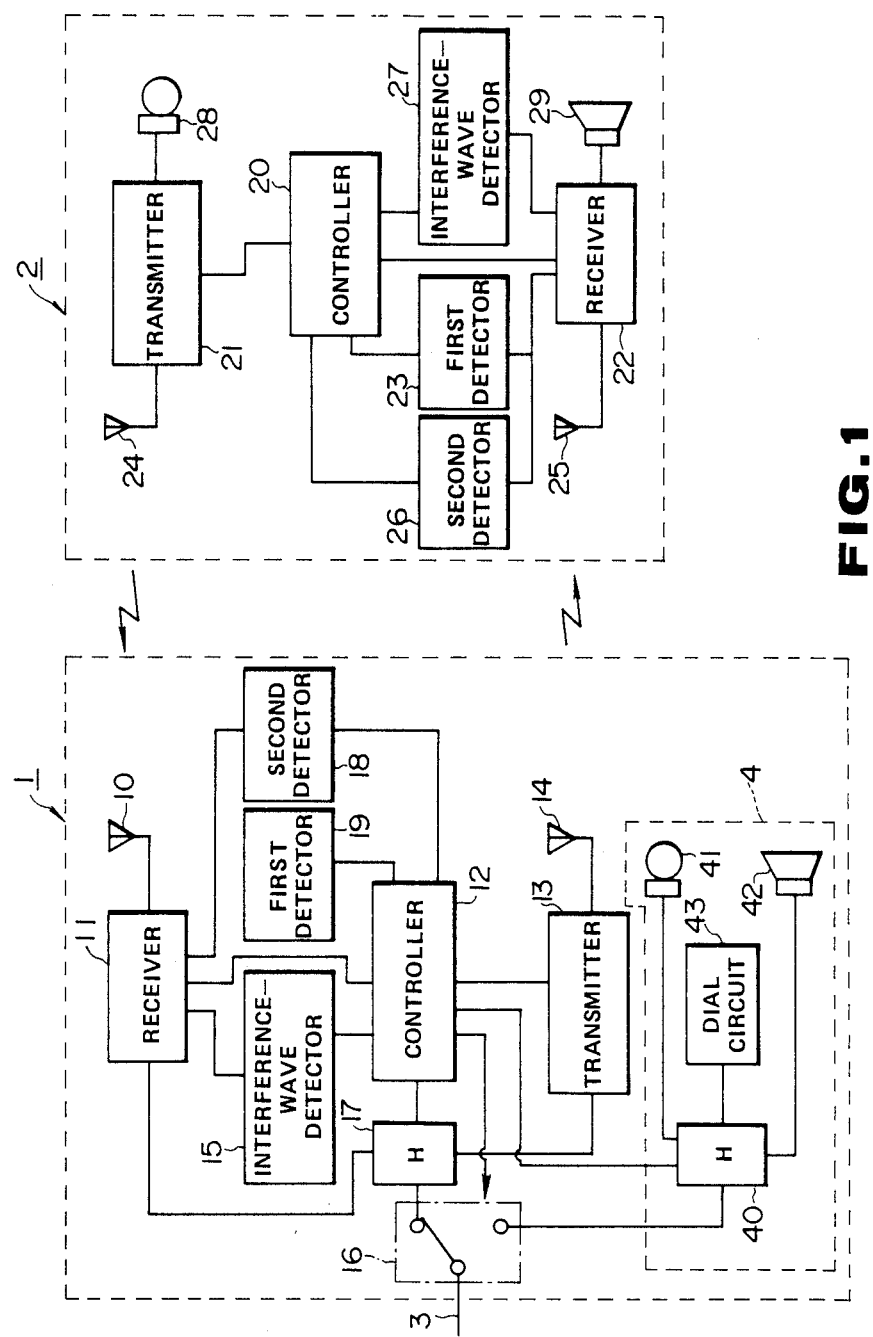
FIG. 1 is a block diagram showing an embodiment of a cordless telephone system in accordance with the present invention.

Referring first to FIG. 1, there is shown, in a block form, an embodiment of a cordless telephone system in accordance with the present invention, in which a connection unit 1 is connected through a radio communication circuit to a radio telephone set 2 and also connected to a wire telephone circuit 3. Also attached to the connection unit 1 is a wire telephone set 4.

Figure 2A:
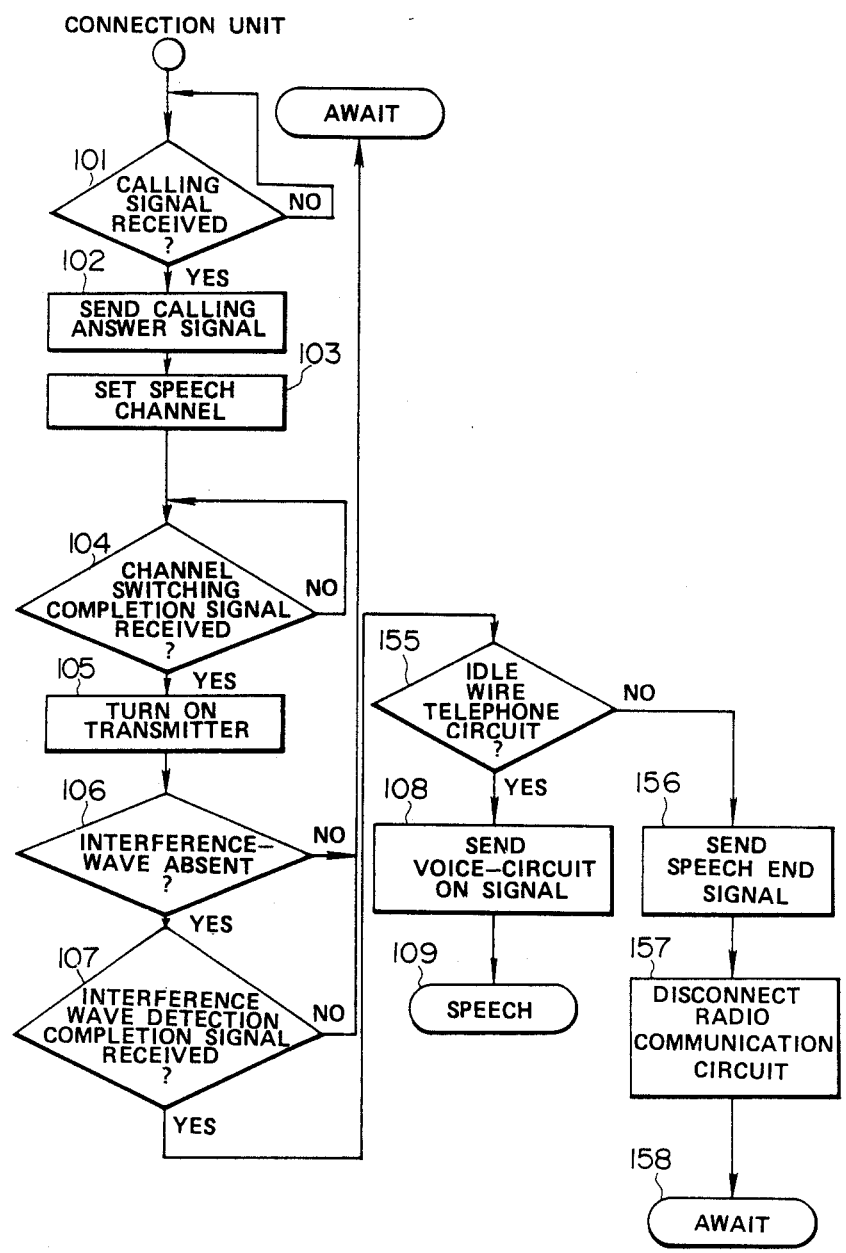
FIG. 2(a) and (b) are flowcharts respectively showing the operational procedures of a connection unit and a radio telephone set in a calling mode in the embodiment of FIG. 1.
Figure 2B:
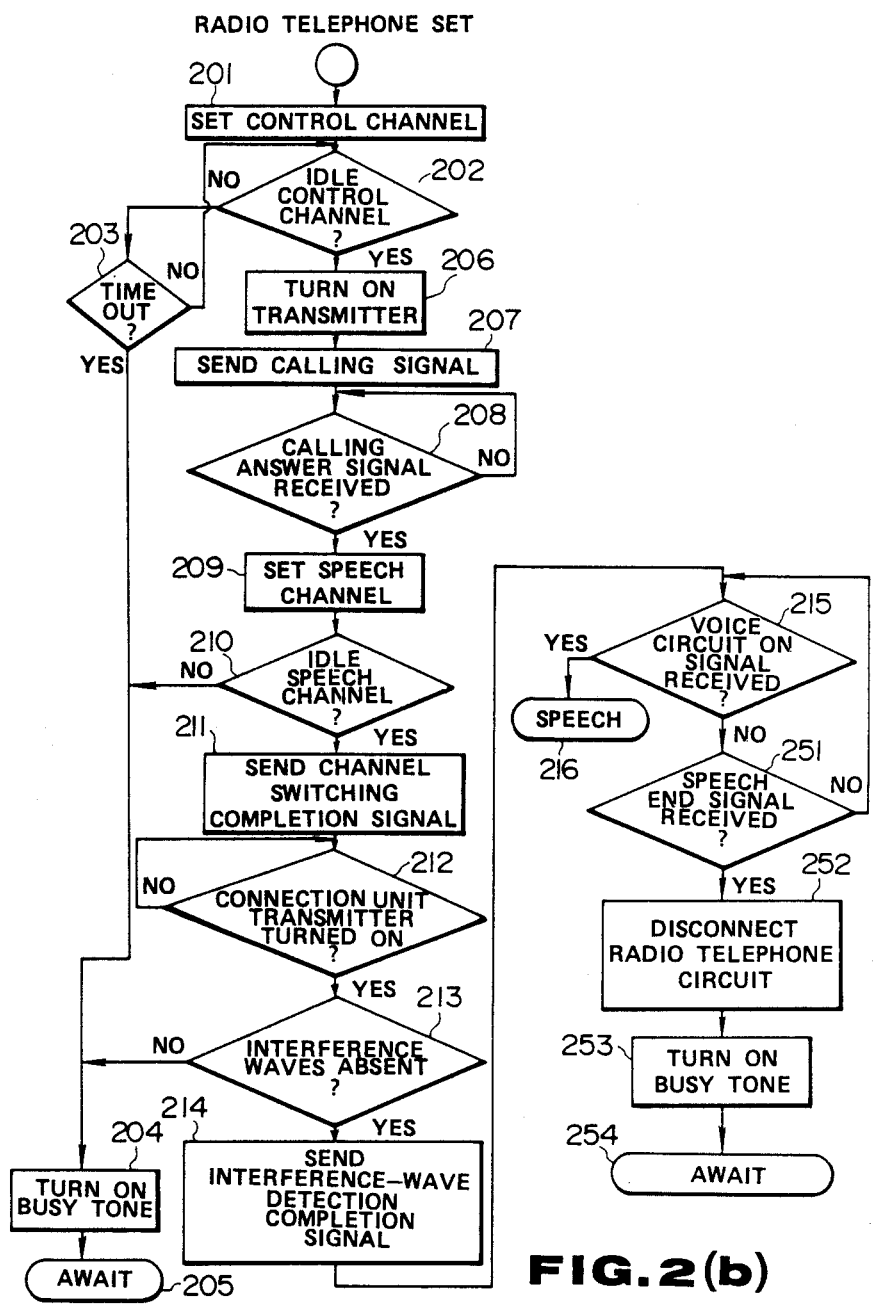

When the radio telephone set 2 makes a call, the connection unit 1 and radio telephone set 2 are operated based on flowcharts shown in FIG. 2(a) and (b) respectively. More specifically, in the radio telephone set 2, when a hook switch (not shown) is first turned off, that is, when a handset of the radio telephone is picked up to put the telephone in its off-hook mode, then a controller 20 sets a receiver 22 at a control channel (step 201) and judges whether or not the control channel is idle on the basis of the received electric field of the receiver 22 detected by a first detection circuit 23 (step 202). When the channel is not idle, the controller 20 waits for a predetermined constant time (step 203) and then applies a busy tone signal through the receiver 22 to a loudspeaker 29 (step 204) to put the telephone in an await mode (step 205). If the control channel is idle, then the controller 20 turns on the transmitter 21 (step 206) to radiate a calling signal from a transmitting antenna 24 through the transmitter 21 (step 207).

On the other hand, in the connection unit 1, when the calling signal is received at a receiving antenna 10, the signal is applied to a receiver 11 (step 101) and further to a controller 12. The controller 12, when receiving the calling signal, sends an answer signal in response to the calling signal containing information indicative of the idle speech channel through a transmitter 13 to a transmitting antenna 14 from which the calling answer signal is radiated (step 102). Thereafter, the controller 12 turns off the transmitter 13 and sets the receiver 11 and the transmitter 13 at the idle speech channel (step 103).

The radio telephone set 2 catches the calling answer signal at a receiving antenna 25 and sends it to the receiver 22 (step 208) and further to the controller 20. The controller 20, when receiving the calling answer signal, turns off the transmitter 21 and sets the transmitter 21 and the receiver 22 at the speech channel specified by the calling answer signal (step 209). And the controller 20 judges, on the basis of the received electric field of the receiver 22 detected by a first detection circuit 23, whether or not the speech channel is idle (step 210). If idle, then the controller 20 turns on the transmitter 21 to supply a channel switching completion signal from the transmitter 21 to the antenna 24, from which the channel switching completion signal is radiated (step 211).

The connection unit 1 receives the channel switching completion signal at the antenna 10 and applies it to the receiver 11 (step 104) and further to the controller 12. The controller 12, when receiving this signal, turns on the transmitter 13 (step 105) and judges whether or not an interference wave detection circuit 15 has detected the absence of any interference waves in the received electric field of the receiver 11 (step 106).

The controller 20 of the radio telephone set 2 judges whether the transmitter 13 of the connection unit 1 has been turned on at step 105 on the basis of the received electric field of the receiver 22 detected by the second detection circuit 26 (step 212). Further, controller 20 determines whether or not the interference wave detection circuit 27 has detected the absence of any interference waves in the received field of the receiver 22 (step 213). In the absence of the interference waves, the controller 20 supplies an interference-wave detection completion signal through the transmitter 21 to the antenna 24, from which the signal is transmitted (step 214).

The connection unit 1 receives the interference-wave detection completion signal at the antenna 10 and applies it to the receiver 11 (step 107) and further to the controller 12. The controller 12, when receiving this signal, determines whether a change-over switch 16 is connected to a hybrid circuit 17 (the wire telephone circuit is idle) or connected to a hybrid circuit 40 of the wire telephone set 4 (the wire telephone circuit 3 is not idle) (step 155). If the wire telephone circuit 3 is idle, then the controller 13 sends a voice-circuit ON signal through the transmitter 13 to the antenna 14, from which this signal is radiated (step 108) and thereafter puts the connection unit 1 in the communication mode (step 109). If the wire telephone circuit 3 is not idle, then the controller 12 sends a speech end signal through the transmitter 13 to the antenna 14, form which the on-hook signal is radiated (step 156), and disconnects the radio communication circuit of the speech channel (step 157) to put the connection unit 1 in an await mode (step 158).

The radio telephone set 2 receives either one of the voice-circuit ON signal or the speech end signal at the antenna 25 and sends it to the receiver 22 and further to the controller 20. The controller 20, when receiving the voice-circuit ON signal (step 215), puts the radio telephone set 2 in the communication mode through a microphone 28 and the loudspeaker 29 (step 216). The controller 20, when receiving the speech end signal (step 251), disconnects the radio communication circuit of the speech channel (step 252) and activates the loudspeaker 29 to generate a busy tone therefrom (step 253) and to put the telephone in the await mode (step 254).

In this manner, according to the present embodiment, when the radio telephone set 2 makes a call, the nonexistence of the idle wire telephone circuit 3 causes a speech end signal to be transmitted from the connection unit 1 to the radio telephone set 2, which results in that the radio communication circuit of the speech channel is immediately cut off. For this reason, even if the wire telephone circuit 3 is occupied by the wire telephone set 4 attached to the connection unit 1, the wasteful use of the radio communication circuit can be prevented.

Figure 3A:
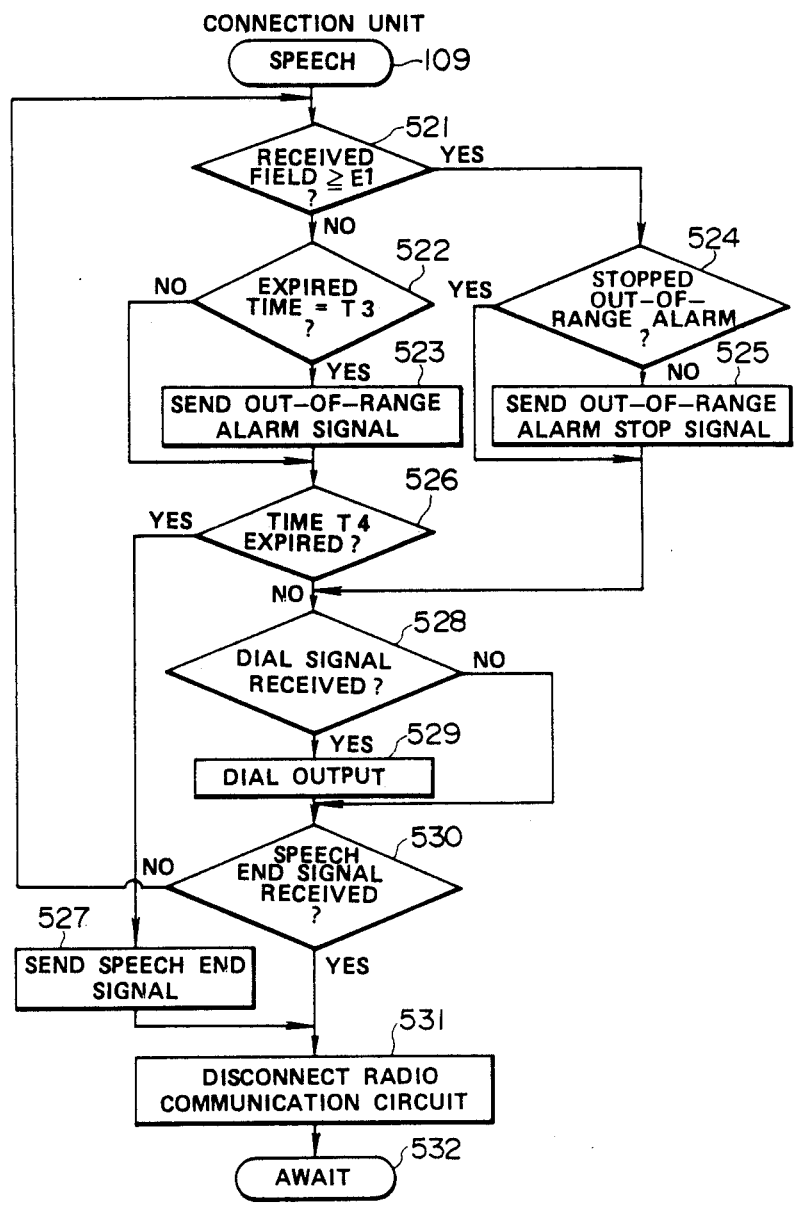
FIG. 3 (a) and (b) are flowcharts respectively showing the operational procedures of the connection unit and radio telephone set in a speech or communication mode in the embodiment of FIG. 1.
Figure 3B:
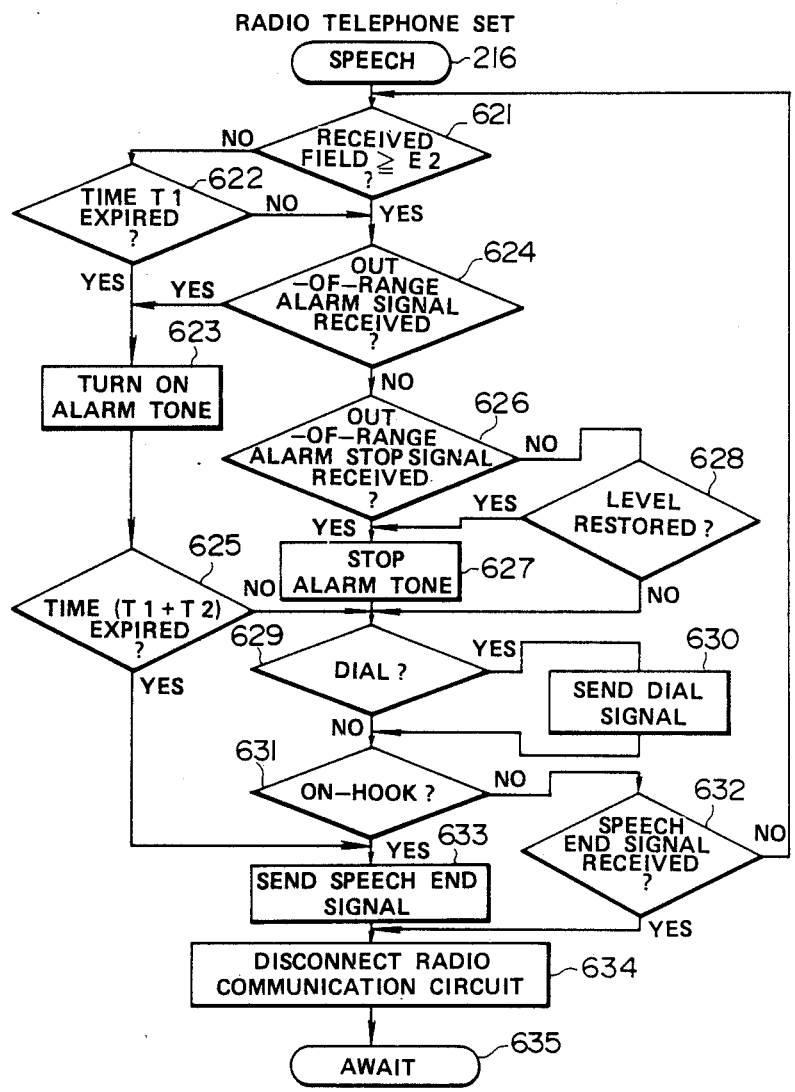

Next, after the connection unit 1 and the radio telephone set 2 are put in the communication mode at the steps 109 and 216 respectively, they are operated according to such flowcharts as shown in FIG. 3(a) and (b) respectively. In more detail, the controller 12 in the connection unit 1 first judges whether or not the received electric field of the speech channel detected by the second detection circuit 18 is at a level of E1 dBμV (e.g., 0 dBμV) or higher (step 521) and when the field is smaller than E1 dBμV, starts measuring the elapsed time. And the controller 12 judges whether or not the measured elapsed time corresponds to the predetermined time T3 (step 522). If so, then the controller 12 sends an out-of-communication-range alarm signal through the transmitter 13 to the antenna 14, from which the alarm signal is transmitted (step 523). When the received field is at a level of E1 dBμV or higher, the controller 12 judges whether or not the transmission of the out-of-communication-range alarm signal is stopped (step 524). If not stopped, then the controller 12 sends an out-of-communication range alarm stop signal through the transmitter 13 to the antenna 14 to radiate the signal from the antenna (step 525).

On the other hand, the controller 20 in the radio telephone set 2 determines whether or not the received electric field of the speech channel detected by the second detection circuit 26 is at a level of E2 dBμV (e.g., 20 dBμV, E2>E1) or higher (step 621) and when the received field is smaller than E2 dBμV, starts the elapsed time. If the elapsed time reaches the predetermined time T1 (step 622) then the controller causes the receiver to activate the loudspeaker 29 and to generate an alarm sound therefrom (step 623). When the measured time does not reach the time T1 at the step 622 or when the received field is equal to or larger than E2 dBμV at the step 621, the controller 20 determines whether or not the receiver 22 has received the out-of-communication-range alarm signal through the antenna 25 from the connection unit 1 at the step 523 (step 624). The reception of the alarm signal at the receiver 22 causes the controller 20 to generate the alarm sound at the step 623. After generation of the alarm sound, the controller 20 measures a time (T1 + T2) longer than the time T1 to determine wether or not the time (T1 + T2) has expired (step 625). Further, the controller 20, when having judged the nonreception of the out-of-communication-range alarm signal at the step 624, determines whether or not an out-of-communication-range alarm stop signal at the step 525 from the connection unit 1 has been received (step 626). If the alarm stop signal has been received, the controller stops the generation of the alarm sound from the loudspeaker 29 (step 627). If nonreception of the out-of-communication-range alarm stop signal is judged at the step 626, then the controller 20 determines whether or not the received electric field detected by the second detection circuit 26 restores to a level of E2 dBμV or higher (step 628). If so, the controller stops the alarm sound at the step 627.

Next, in the radio telephone set 2, a dialing operation (step 629) causes the controller 20 to supply a dial signal through the transmitter 21 to the antenna 24 and transmit the signal from the antenna (step 630). Subsequently, if the receiver 22 does not receive a speech end signal at a step 527 (which will be explained later) through the antenna 25 from the connection unit 1 (step 632), then the controller 20 repeats the operations of the step 621 and the subsequent steps. An on-hook operation (step 631) or the expiration of the time (T1 + T2) (step 625) causes the controller 20 to send the speech end signal through the receiver 21 to the antenna 24 and to transmit the signal therefrom (step 633). Further, the transmission of the speech end signal at the step 633 or the reception of the speech end signal at the step 632 causes the controller 20 to cut off the radio communication circuit of the speech channel (step 634) and to put the radio telephone in the await mode (step 635).

In the connection unit 1, on the other hand, the transmission of the out-of-communication-range alarm signal at the step 523 causes the controller 12 to start measuring the predetermined time T4. The expiration of the time T4 (step 526) causes the controller 12 to send the speech end signal through the transmitter 13 to the antenna 14, from which the signal is radiated (step 527). When the receiver 11 receives the dial signal at the step 630 through the antenna 10 from the radio telephone set 2 (step 528), the controller 12 sends this dial signal onto the wire telephone circuit 3 (step 529). If the receiver 11 is not receiving the speech end signal at the step 633 through the antenna 10 from the radio telephone set 2 (step 530), then the controller 12 repeats the operations of the steps 521 and the subsequent steps. Now, the reception of the speech end signal at the step 530 or the transmission of the speech end signal at the step 527 results in that the controller 12 disconnects the radio communication circuit of the speech channel (step 531) and puts the connection unit 1 in the await mode (step 532).

In this way, in the communication mode of the present embodiment, when the received electric field of the speech channel becomes less than E1 dBμV and less than E2 dBμV, the connection unit 1 and radio telephone set 2 mutually transfer the speech end signal therebetween to disconnect the radio communication circuit. This enables the prevention of wasteful use of the radio communication circuit between the connection unit 1 and radio telephone set 2. When the out-of-communication-range alarm signal is transmitted from the connection unit 1 or when the received electric field of the radio telephone set 2 becomes less than E2 dBμV, this causes the radio telephone set 2 to issue the alarm tone. Thus, the user of the radio telephone set 2 can know that the radio telephone is in a bad communication state and can take a proper measure, for example, by putting the radio telephone closer to the connection unit 1.

Figure 4:
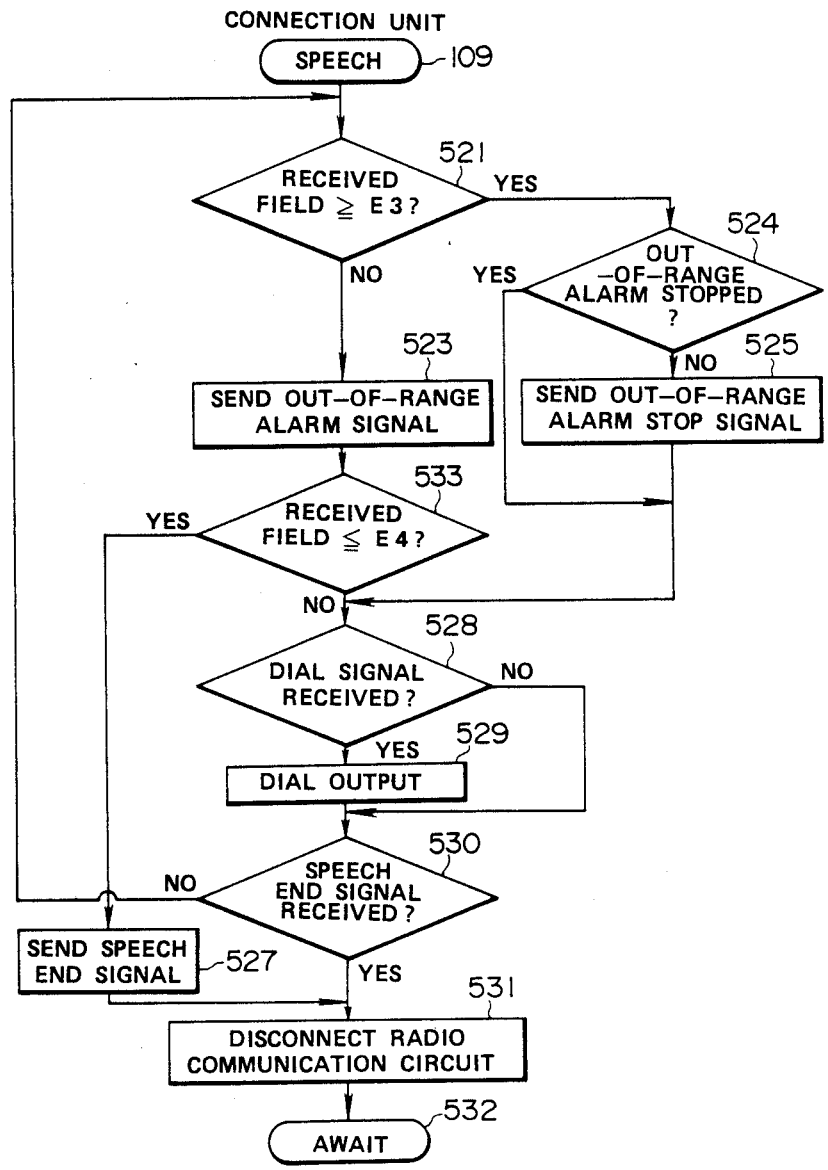
FIG. 4 is a flowchart showing a modification of the flowchart shown in FIG. 3(a)

Further, in another embodiment of present invention, two levels E3 and E4 (E4<E3) may be set in the connection unit 1 so that the connection unit issues the out-of-communication-range alarm signal when the received electric field becomes less than E3 dBμV, whereas the unit transmits the speech end signal when it becomes less than E4 dBμV. In this case, an alarm sound is generated in the radio telephone set 2 when the received electric field of the connection unit 1 becomes less than E3 dBμV, and the radio communication circuit is forcibly cut off when the received field becomes less than E4 dBμV. FIG. 4 shows a flowchart of the present embodiment which corresponds to the flowchart of FIG. 3(a), in which the step 522 in the flowchart of FIG. 3(a) is removed and the step 533 is modified to be one 533 in which it is judged whether or not the received electric field is not smaller than E4 dBμV. That is, when it is determined that the received field becomes less than E4 dBμV in the step 533, the connection unit generates a speech end signal (step 527), while, if the field is not smaller than E4 dBμV then the unit judges whether or not to have received a dial signal (step 528).

Figure 5A:
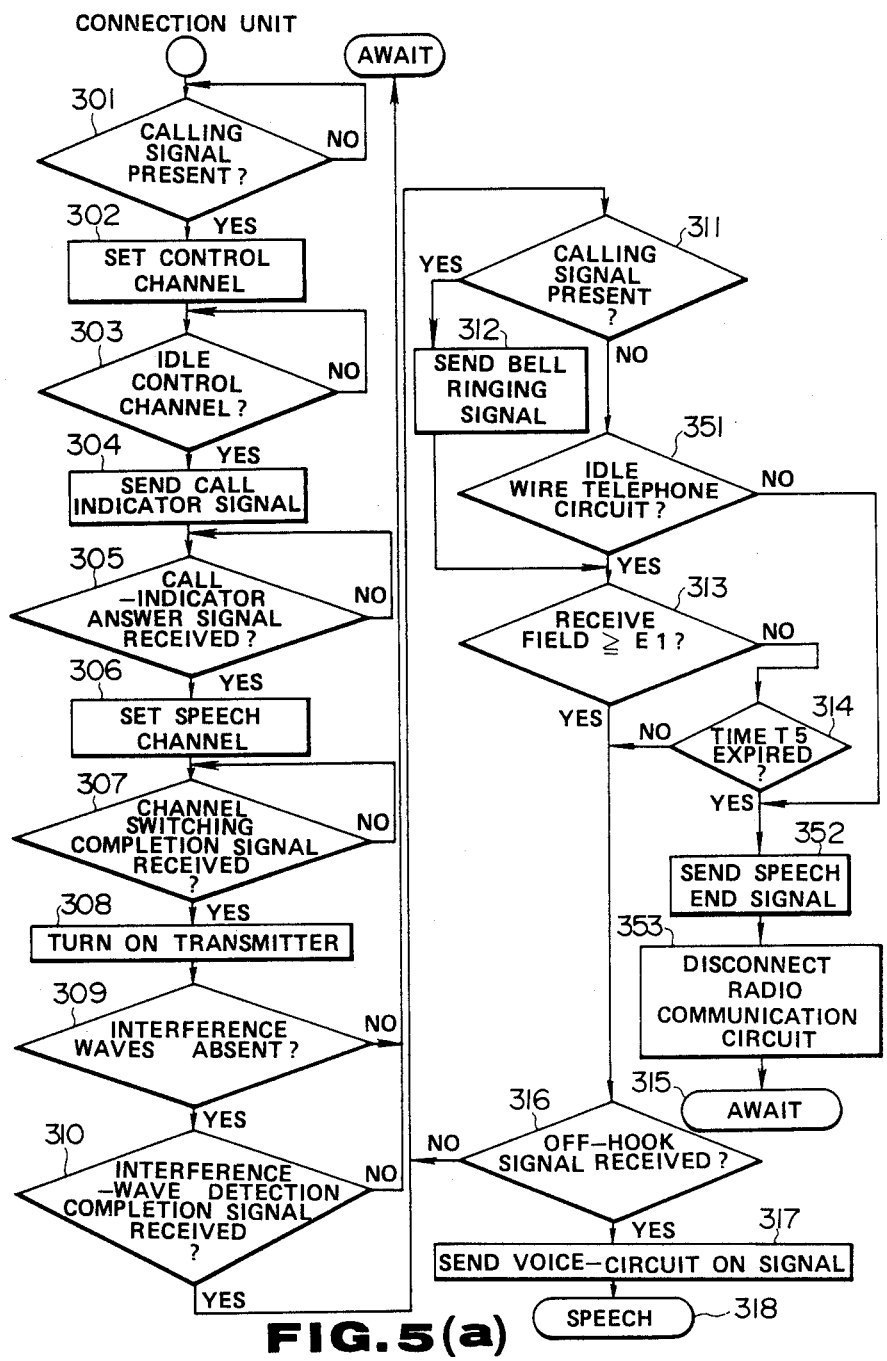
FIG. 5(a) and (b) are flowcharts respectively showing the operational procedures of the connection unit and radio telephone set in a call receiving mode in the embodiment of FIG. 1.
Figure 5B:
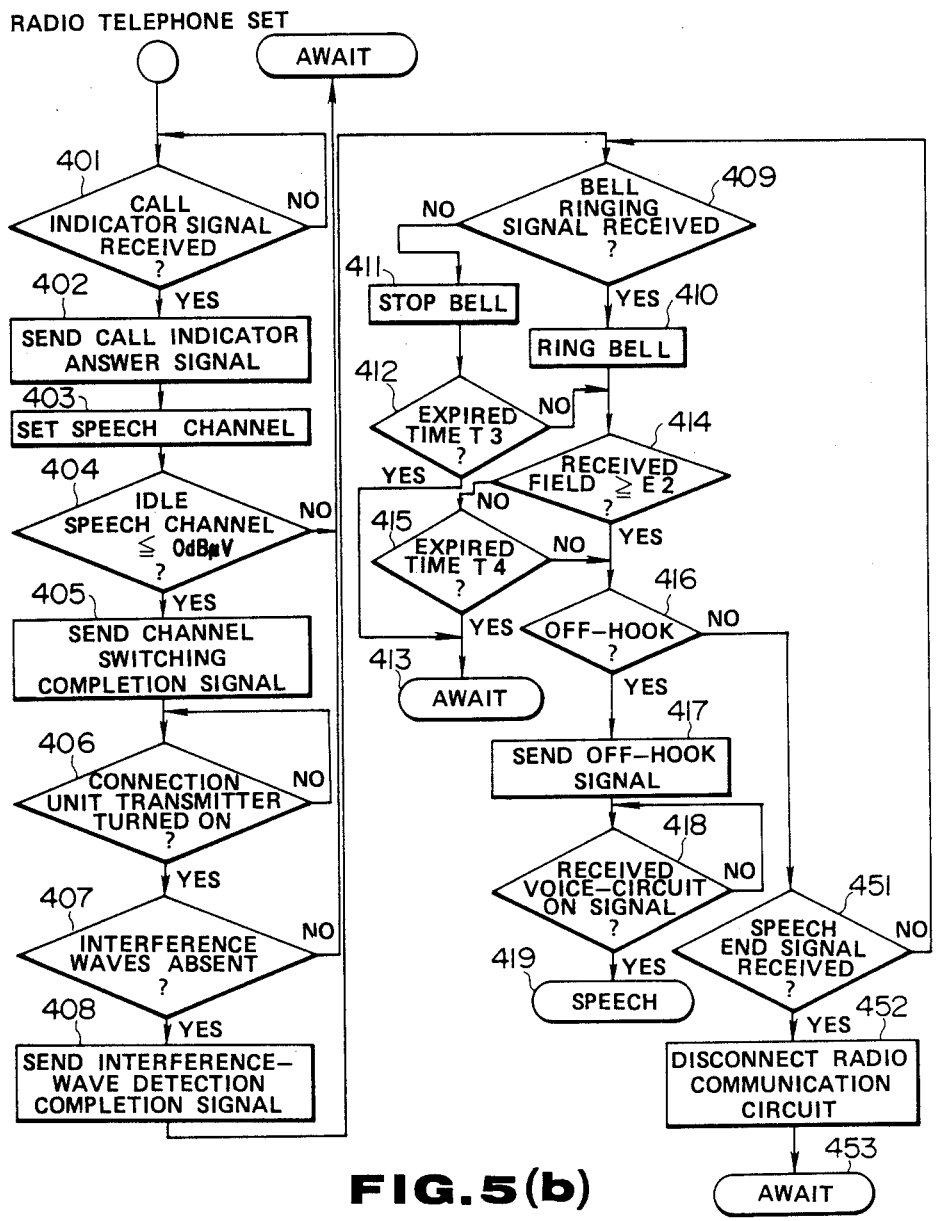
Figure 6B:
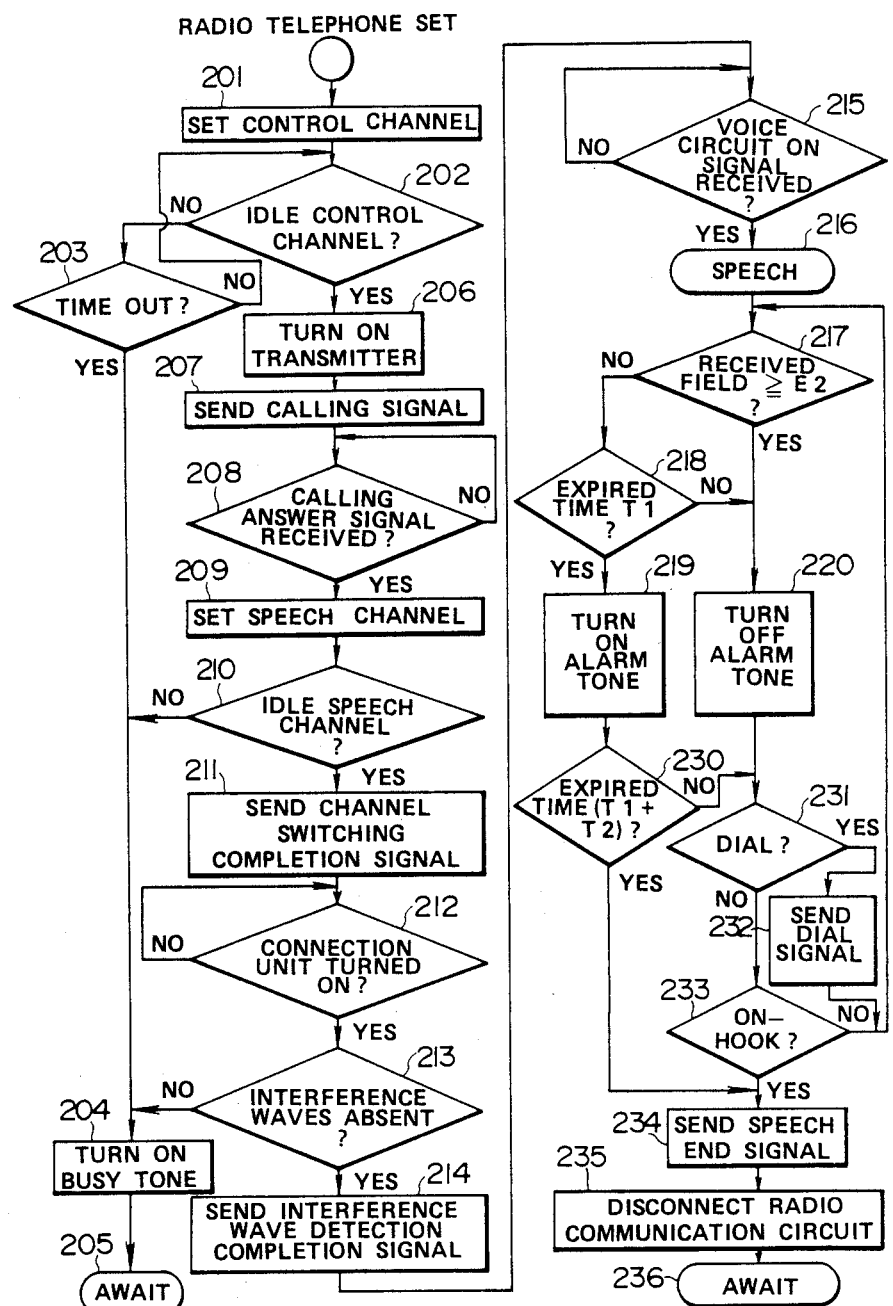
FIG. 6 (a) and (b) are flowcharts respectively showing the operational procedures of a connection unit and radio telephone set of a prior art cordless telephone system in a calling mode.
Figure 7A:
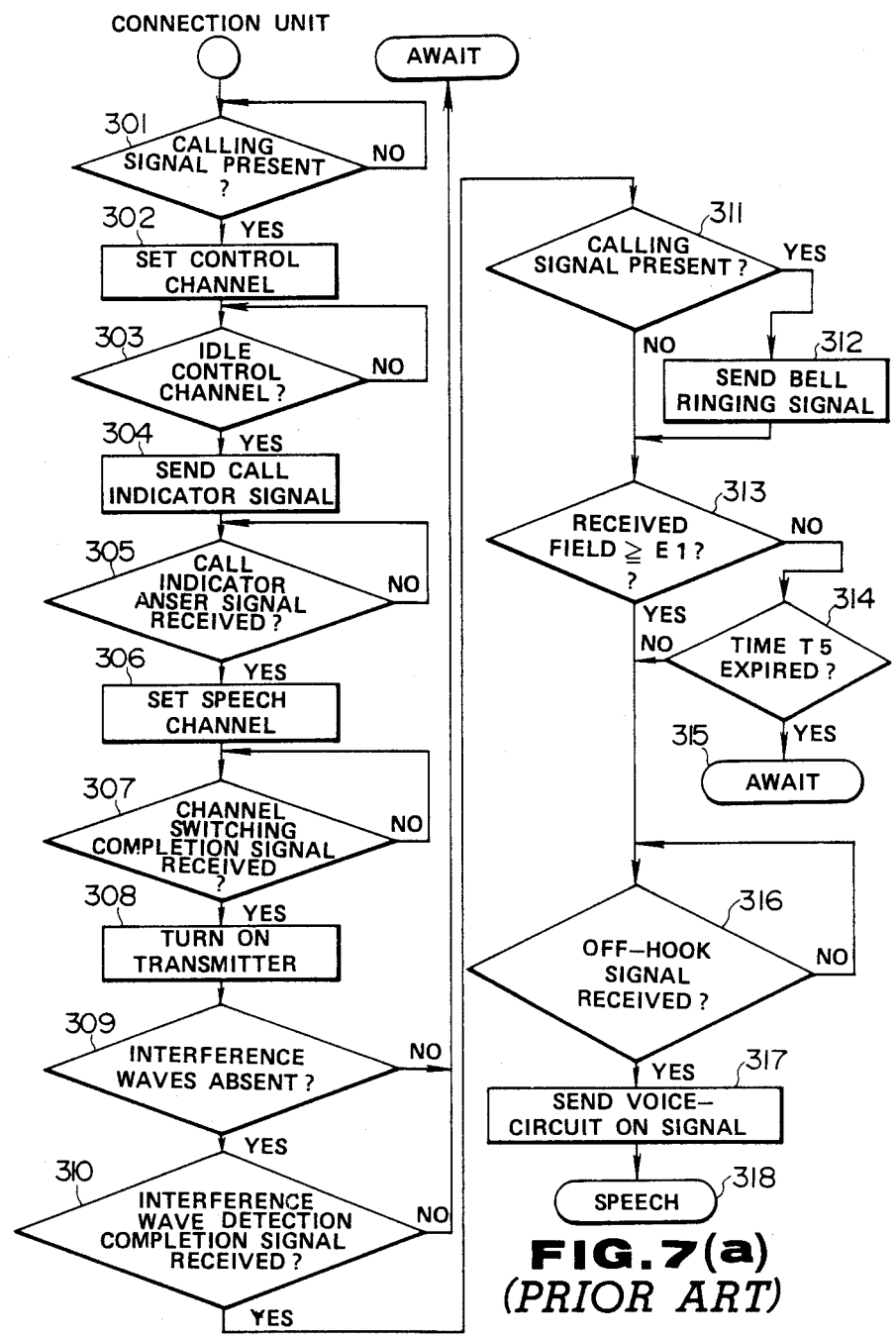
FIG. 7(a) and (b) are flowcharts respectively showing the operational procedures of the connection unit and radio telephone set of the prior art cordless telephone system in a call receiving mode.

FIG. 5(a) and (b) are flowcharts for explaining the operations of the connection unit 1 and the radio telephone set 2 in the event that a calling signal sent from the wire telephone circuit 3 is applied to the connection unit 1 to call the radio telephone 2. First, the connection unit 1 applies the calling signal from the wire telephone circuit 3 to the controller 12 through the change-over switch 16 and the hybrid circuit 17. The controller 12, when receiving the calling signal (step 301), sets the transmitter 13 and the receiver 11 at a control channel (step 302). And the controller 12, when determining on the basis of the received electric field of the receiver 11 detected by the first detection circuit 19 that the control channel is idle (step 303), turns on the transmitter 13 and transmits a call indicator signal containing information indicative of the idle speech channel from the antenna 14 through the transmitter 13 (step 304).

On the other hand, the radio telephone set 2 receives the call indicator signal from the antenna 25 and applies it to the receiver 22 (step 401) and further to the controller 20. The controller 20, when receiving the call indicator signal, sends an answer signal in response to the call indicator signal to the transmitter 21 and further to the antenna 24, from which the answer signal is radiated (step 402). Thereafter, the controller 20 sets the transmitter 21 and receiver 22 at the speech channel specified by the call indicator signal (step 403) and judges whether or not the speech channel is idle on the basis of the received electric field of the receiver 22 detected by the first detection circuit 23 (step 404). If the speech channel is idle, then the controller 20 sends a channel switching completion signal through the transmitter 21 to the antenna 24 to transmit the signal from the antenna (step 405).

On the side of the connection unit 1, when the antenna 10 receives the call-indicator answer signal at the step 402 transmitted from the radio telephone 2 and applies it to the receiver 11 (step 305), the controller 12 turns off the transmitter 13 and sets the transmitter 13 and receiver 11 at the aforementioned idle speech channel (step 306). Thereafter, when the connection unit 1 receives at the antenna 10 the channel switching completion signal at the step 405 transmitted from the radio telephone 2 and applies it to the receiver 11 (step 307), the controller 12 turns on the transmitter 13 (step 308) and judges whether or not the interference-wave detection circuit 15 has detected the absence of any interference waves in the received electric field of the receiver 11 (step 309).

The controller 20 of the radio telephone set 2 determines that the transmitter 13 of the connection unit 1 has been turned on at the step 308 on the basis of the received field of the receiver 22 detected by the second detection circuit 26 (step 406). When the controller 20 determines that the interference-wave detection circuit 27 detects the absence of any interference waves in the received field of the receiver 22 (step 407), the controller sends an interference-wave detection completion signal through the transmitter 21 to the antenna 24, from which the signal is radiated (step 408).

When the connection unit 1 receives at the antenna 10 the interference-wave detection completion signal and applies it to the receiver 11 (step 310), the controller 20 judges whether or not the calling signal is still sent from the wire telephone circuit 3 (step 311). If the calling signal is still sent then the controller 20 sends a bell ringing signal through the transmitter 13 to the antenna 14 to transmit the signal from the antenna (step 312).

In the radio telephone set 2, when the antenna 25 receives the bell ringing signal and applies it to the receiver 22 (step 409), the controller 20 of the radio telephone 2 rings a bell (not shown) to inform the user of the radio telephone of the presence of the call (step 410). The non-reception of the bell ringing signal in the radio telephone 2 causes no ringing of the bell (step 411). When the bell is not ringed at the step 411, the controller 20 measures the predetermined time T3. The termination of the time T3 (step 412) causes the radio telephone to be put in the await mode (step 413). When the bell is ringed at the step 410 or when the time T3 is not expired at the step 412, the controller 20 judges whether or not the received electric field of the receiver 22 detected by the second detection circuit 26 is not smaller than E2 dBμV (step 414). If the received field reaches a level of E2 dBμV or less, then the controller 20 measures the predetermined time T4. The expiration of the time T4 (step 415) causes the radio telephone to put in the await mode (step 413). When the time T4 is not expired at the step 415 or when the received field is not smaller than E2 dBμV at the step 414, the controller 20 determines whether or not the handset of the radio telephone has been picked up, that is, the radio telephone has been changed to the off-hook mode (step 416). The off-hook operation causes an off-hook signal to be transmitted from the antenna 24 through the transmitter 21 (step 417). Thereafter, when the radio telephone set receives at the antenna 25 a voice-circuit ON signal at a step 317 (which will be explained later) transmitted from the connection unit 1 and applies it to the receiver 22 (step 418), the controller 20 sets the radio telephone set 2 in the communication mode (step 419). In the absence of the off-hook operation at the step 416, the controller 20 judges whether or not the speech end signal at the step 352 (which will be explained later) is transmitted from the connection unit 1 through the antenna 25 to the receiver 22 (step 451). If the receiver 22 does not receive the on-hook signal, then the radio telephone set repeats the operations of the step 409 and the subsequent steps. The determination of the reception of the speech end signal at the step 451 causes the controller 20 to disconnect the radio communication circuit of the speech channel (step 452) and put the radio telephone in the await mode (step 453).

The controller 12 of the connection unit 1, on the other hand, if it is determined at the step 311 that there is no calling signal sent from the wire telephone circuit 3, judges whether the change-over switch 16 is connected to the hybrid circuit 17 (the wire telephone circuit 3 is idle) or the switch 16 is connected to the hybrid circit 40 of the wire telephone set 4 (the wire telephone circuit 3 is not idle) (step 351). In the case of the idle wire telephone circuit 3, the controller 12 judges whether or not the received electric field of the receiver 11 detected by the second detection circuit 18 is $\geq E1$ dB$\mu$V (step 313). If the rereived field reaches a level of less than E1 dB$\mu$V, then the controller 12 measures the predetermined time T5 to determine whether or not the time T5 has expired (step 314). When the time T5 is not expired at the step 314 or when the received field is not smaller than E1 dB$\mu$V at the step 313, the reception of the off-hook signal (at the step 417) transmitted from the radio telephone set 2 through the antenna 10 at the receiver 11 (step 316) causes the controller 20 to apply the voice-circuit ON signal to the transmitter 13 for transmission of the signal from the antenna 14 (step 317) and to put the connection unit 1 in the communication mode (step 318). When the time T5 is expired at the step 314 or when the wire telephone circuit 3 is not idle at the step 351, for example, due to the response of the wire telephone 4 to the call, the controller 12 causes the speech end signal to transmit from the antenna 14 through the transmitter 13 (step 352), the radio communication circuit of this speech channel to be disconnected (step 353), and the connection unit 1 to be put in the await mode (315). The control operations ranging from the communication mode to the disconnection of the radio communication circuit are substantially the same as those shown in FIG. 3(a) and (b).

In the cordless telephone system of the present embodiment, in the case where the system receives a call from the wire telephone circuit, the level of the received electric field of the speech channel lower than E1 dB$\mu$V and lower than E2 dB$\mu$V causes the connection unit 1 and radio telephone set 2 to perform mutual transfer of the speech end signal therebetween and to disconnect the radio communication circuit. As a result, the radio communication circuit between the connection unit 1 and radio telephone set 2 can be prevented from being wastefully used. In addition, in the case where the wire telephone circuit 3 is not idle, this causes the speech end signal to be transmitted from the connection unit 1 to the radio telephone set 2, whereby the radio communication circuit of the speech channel is immediately cut off. As a result, even when the wire telephone circuit 3 is occupied by the wire telephone set 4 attached to the connection unit 1, the wastful use of the ratio communication circuit can be avoided.

What is claimed is:

1. A cordless telephone system, comprising:
   a radio telephone set;
   a connection unit connected to a wire telephone circuit and also connected through a radio communication circuit to said radio telephone set, for performing interconnection control between said wire telephone circuit and said radio telephone set;
   transmission means provided in said connection unit, for sending a disconnect signal from the connection unit to said radio telephone set to disconnect the radio communication circuit when a received electric field of said radio communication circuit is reduced to at least a predetermined level; and
   disconnection means provided in said radio telephone set, for disconnecting the radio communication circuit when said disconnection means receives said disconnect signal.

2. A cordless telephone system, comprising;
   a radio telephone set;
   a connection unit connected to a wire telephone circuit and also connected through a radio communication circuit to said radio telephone set, for performing interconnection control between said wire telephone circuit and said radio telephone set;
   transmission means provided in said connection unit, for sending a disconnect signal from the connection unit to said radio telephone set to disconnect the radio communication circuit when the received electric field of said radio communication circuit is reduced to at least a predetermined level and kept at said at least said predetermined level continuously for at least a predetermined time period; and
   disconnection means provided in said radio telephone set, for disconnecting the radio communication circuit when said disconnection means receives said disconnect signal.

3. A cordless telephone system comprising:
   a radio telephone set;
   a connection unit connected to a wire telephone circuit and also connected through a radio communication circuit to said radio telephone set, for performing interconnection control between said wire telephone circuit and said radio telephone set;
   first transmission means provided in said radio telephone set, for sending a first disconnect signal from said radio telephone set to the connection unit when a signal on the radio communication circuit is put in a first state in which a received electric field of said radio communication circuit is reduced to at least one of a plurality of predetermined levels;
   second transmission means provided in said connection unit, for sending a second disconnect signal from said connection unit to said radio telephone set when the signal on the radio communication circuit is put in said first state;
   first disconnection means provided in said connection unit, for disconnecting the radio communication circuit when said first disconnection means receives said first disconnect signal; and second disconnection means provided in said radio telephone set, for disconnecting the radio communication circuit when said second disconnection means receives said second disconnect signal.

4. A cordless telephone system as set forth in claim 3, wherein said first transmission means generates said first disconnect signal when a received electric field of said radio communication circuit is reduced to at least a first predetermined level, said second transmission means generates said second disconnect signal when the received electric field of said radio communication circuit is reduced to at least a second predetermined level, said first predetermined level being higher than said second predetermined level.

5. A cordless telephone system as set forth in claim 3, wherein said first transmission means generates said first disconnect signal when the received electric field of said radio communication circuit is reduced to at least a first predetermined level and kept at said at least a first predetermined level continuously for at least a first set time period, and said second transmission means generates said second disconnect signal when the received electric field of said radio communication circuit is reduced to at least a second predetermined level and kept at said at least a second predetermined level continuously for at least a second set time period, said first predetermined level being higher than said second predetermined level, said first set time period being longer than said second set time period.

6. A cordless telephone system comprising:
  a radio telephone set;
  a connection unit connected to a wire telephone circuit and also connected through a radio communication circuit to said radio telephone set, for performing interconnection control between said wire telephone circuit and said radio telephone set;
  first transmission means provided in said radio telephone set, for sending a first disconnect signal from said radio telephone set to the connection unit when a signal on the radio communication circuit is put in a first state in which a received electric field of said radio communication circuit is reduced to at least a predetermined level;
  second transmission means provided in said connection unit, for sending an alarm signal from said connection unit to said radio telephone set when the signal on the radio communication circuit is put in said first state and for sending a second disconnect signal when said signal on the radio communication circuit is put in a second state in which said electric field of said radio communication circuit is reduced to a second predetermined level;
  first disconnection means provided in said connection unit for disconnecting the radio communication circuit when said first disconnection means receives said first disconnect signal;
  means provided in said radio telephone set, for generating an alarm when receiving said alarm signal; and
  second disconnection means provided in said radio telephone set, for disconnecting the radio communication circuit when said second disconnection means receives said second disconnect signal.

7. A cordless telephone system as set forth in claim 6, wherein said first transmission means generates said first disconnect signal when a received electric field of said radio communication circuit is reduced to at least said first predetermined level, said second transmission means includes means for sending said alarm signal when the received electric field of said radio communication circuit is reduced to said at least a second predetermined level and also includes means for sending said second disconnect signal when the received electric field is reduced to at least a third predetermined level, said first predetermined level being higher than said third predetermined level, and said second predetermined level being lower than said third predetermined level.

8. A cordless telephone system as set forth in claim 6, wherein said first transmission means generates said first disconnect signal when the received electric field of said radio communication circuit is reduced to at least said first predetermined level and kept at at least said first predetermined level continuously for at least a first set time period, said second disconnection means includes alarm means for generating an alarm signal when the received electric field of said radio communication circuit is reduced to at least said second predetermined level and kept at at least said second predetermined level continuously for at least a second set time period and also includes means for generating said second disconnect signal when the received electric field of said radio communication circuit is reduced to at least said second predetermined level and kept at at least said second predetermined level continuously for at least a third set time period, said first predetermined level being higher than said second predetermined level, said first set time period being longer than said third set time period, and said second set time period being shorter than said third set time period.

9. A cordless telephone system as set forth in claim 8, wherein said alarm means generates said alarm signal when the received electric field of said radio communication circuit is reduced to at least said first predetermined level and kept at at least said first predetermined level continuously for at least a fourth set time period.

10. A cordless telephone system comprising:
  a radio telephone set;
  a connection unit connected to a wire telephone circuit and also connected through a radio communication circuit to said radio telephone set, for performing interconnection control between said wire telephone circuit and said radio telephone set;
  transmission means provided in said connection unit for sending a disconnect signal from the connection unit to said radio telephone set to disconnect the radio communication circuit when said wire telephone circuit is put in a first state in which said wire circuit cannot be used because said wire circuit is being occupied by another device connected to said wire telephone circuit; and
  disconnection means provided in said radio telephone set for disconnecting the radio communication circuit when said disconnection means receives said disconnect signal.

11. A cordless telephone system, comprising:
  a radio telephone set;
  a connection unit connected to a wire telephone circuit and also connected through a radio communication circuit to said radio telephone set, for performing interconnection control between said wire telephone circuit and said radio telephone set, said connection unit having a wire telephone set;
  transmission means provided in said connection unit for sending a disconnect signal from the connection unit to said radio telephone set to disconnect the radio communication circuit when said wire telephone circuit is connected to said wire telephone set; and disconnection means provided in said radio telephone set for disconnecting the radio communication circuit when said disconnection means receives said disconnect signal.

12. A cordless telephone system comprising:

a radio telephone set;

a connection unit connected to a wire telephone circuit and also connected through a radio communication circuit to said radio telephone set, for performing interconnection control between said wire telephone circuit and said radio telephone set;

a wire telephone set provided in said connection unit;

first transmission means provided in said radio telephone set, for sending a first disconnect signal from said radio telephone set to the connection unit to disconnect the radio communication circuit when a signal on the radio communication circuit is put in a first state in which said radio communication circuit is reduced to at least a predetermined level or when said wire telephone circuit is connected to said wire telephone set;

second transmission means provided in said connection unit, for sending a second disconnect signal from said connection unit to said radio telephone set to disconnect the radio communication circuit when the signal on the radio communication circuit is put in said first state;

first disconnection means provided in said connection unit, for disconnecting the radio communication circuit when said first disconnection means receives said first disconnect signal; and second disconnection means provided in said radio telephone set for disconnecting the radio communication circuit when said second disconnection means receives said second disconnect signal.

13. A cordless telephone system comprising:

a radio telephone set;

a connection unit connected to a wire telephone circuit and also connected through a radio communication circuit to said radio telephone set, for performing interconnection control between said wire telephone circuit and said radio telephone set;

a wire telephone set provided in said connection unit;

first transmission means provided in said radio telephone set, for sending a first disconnect signal from said radio telephone set to the connection unit to disconnect the radio communication circuit when a signal on the radio communication circuit is put in a first state in which said radio communication circuit is reduced to at least one of a plurality of predetermined levels or when said wire telephone circuit is connected to said wire telephone set;

second transmission means provided in said connection unit, for sending a second disconnect signal from said connection unit to said radio telephone set to disconnect the radio communication circuit when the signal on the radio communication circuit is put in said first state;

first disconnection means provided in said connection unit, for disconnecting the radio communication circuit when said first disconnection means receives said first disconnect signal; and second disconnection means provided in said radio telephone set for disconnecting the radio communication circuit when said second disconnection means receives said second disconnect signal;

wherein said first transmission means generates said first disconnect signal when a received electric field of said radio communication circuit is reduced to at least a first predetermined level, said second transmission means generates said second disconnect signal when the received electric field of said radio communication circuit is reduced to at least a second predetermined level, said first predetermined level being higher than said second predetermined level.

14. A cordless telephone system comprising:

a radio telephone set;

a connection unit connected to a wire telephone circuit and also connected through a radio communication circuit to said radio telephone set, for performing interconnection control between said wire telephone circuit and said radio telephone set;

a wire telephone set provided in said connection unit;

first transmission means provided in said radio telephone set, for sending a first disconnect signal from said radio telephone set to the connection unit to disconnect the radio communication circuit when a signal on the radio communication circuit is put in a first state in which said radio communication circuit is reduced to at least one of a plurality of predetermined levels or when said wire telephone circuit is connected to said wire telephone set;

second transmission means provided in said connection unit, for sending a second disconnect signal from said connection unit to said radio telephone set to disconnect the radio communication circuit when the signal on the radio communication circuit is put in said first state;

first disconnection means provided in said connection unit, for disconnecting the radio communication circuit when said first disconnection means receives said first disconnect signal; and second disconnection means provided in said radio telephone set for disconnecting the radio communication circuit when said second disconnection means receives said second disconnect signal;

wherein said first transmission means generates said first disconnect signal when the received electric field of said radio communication circuit is reduced to at least a first predetermined level and kept at at least said first predetermined level continuously for at least a first set time period, said second transmission means generates said second disconnect signal when the received electric field of said radio communication circuit is reduced to at least a second predetermined level and kept at at least said second predetermined level continuously for at least a second set time period, said first predetermined level being higher than said second predetermined level, and said first set time period being longer than said second set time period.

* * * * *